March 12, 1940.  F. A. DONALDSON  2,193,479
CENTRIFUGAL AIR CLEANER
Filed March 22, 1939   2 Sheets-Sheet 2

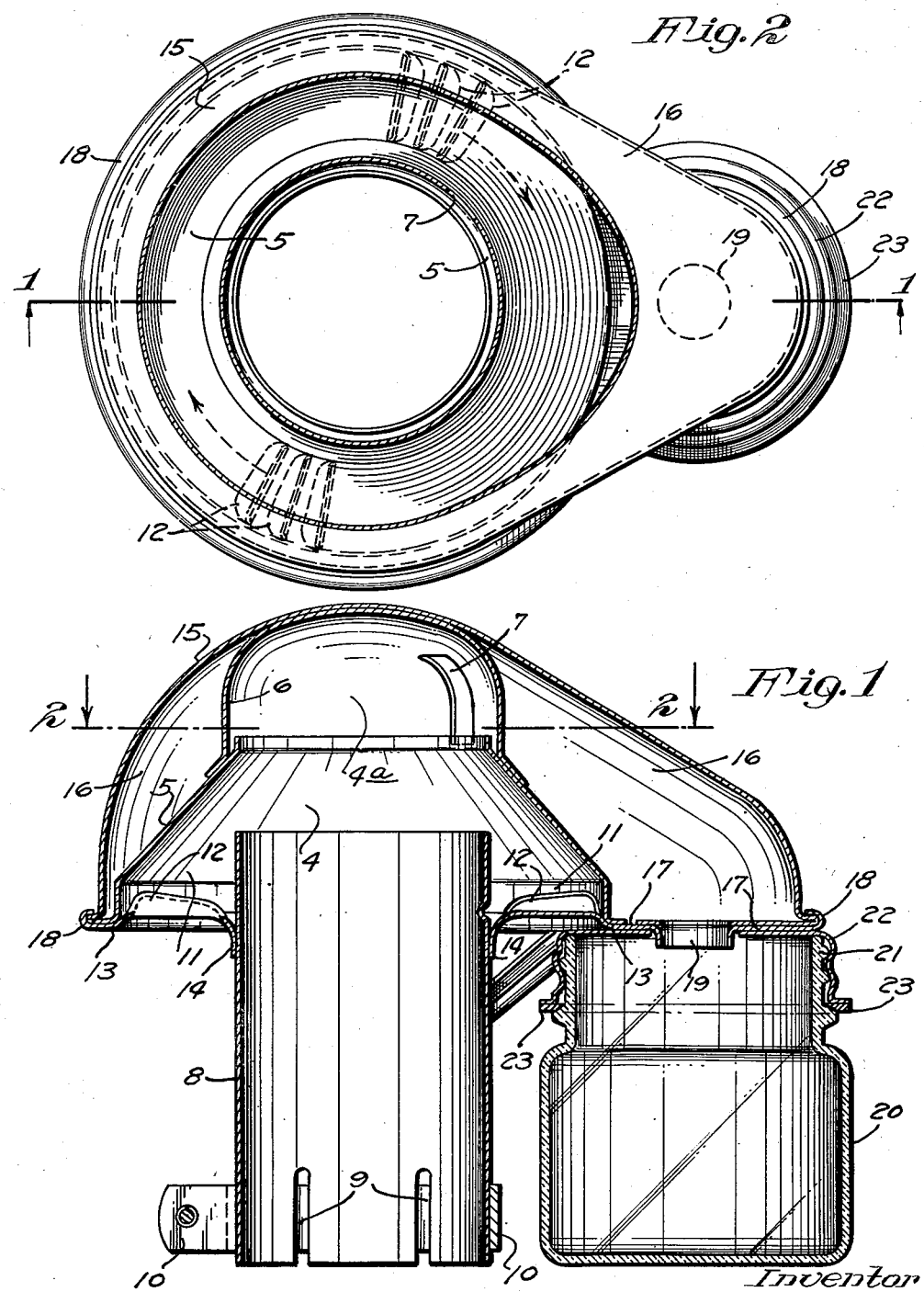

Inventor
Frank A. Donaldson
By his Attorneys

Patented Mar. 12, 1940

2,193,479

UNITED STATES PATENT OFFICE 2,193,479

CENTRIFUGAL AIR CLEANER

Frank A. Donaldson, St. Paul, Minn.

Application March 22, 1939, Serial No. 263,505

7 Claims. (Cl. 183—91)

My present invention relates to improvements in centrifugal or cyclone type of air cleaners and more particularly to cleaners of the type described embodying closed dust receptacles for the collection of separated dust, as distinguished, for example, from those cleaners of the type which eject the separated dust directly to atmosphere.

While the cleaner of this invention is adapted for a certain variety of uses, it is particularly adapted for use in connection with internal combustion engines for cleaning the air drawn into the engine's intake.

At the present state of the art such centrifugal or cyclone type of cleaners are usually employed as primary air cleaners used in combination with and located ahead of more highly efficient filter or fluid bath air cleaners.

An object of the instant invention is the provision of an air cleaner of the type described that is adapted to be mounted directly on and form a sort of cap over the upper end of a vertically disposed intake tube or duct, and incorporating a final dust receptacle extending below the main body of the cleaner and located in radially spaced relation to the intake tube or duct.

The above and other important objects and advantages of the invention will become apparent from the following specification, claims and drawings.

In the accompanying drawings like characters indicate like parts throughout the several views.

Referring to the drawings:

Fig. 1 is an axial sectional view through the cleaner taken on the line 1—1 of Fig. 2;

Fig. 2 is a transverse sectional view with some parts on the section line shown in full taken on the line 2—2 of Fig. 1.

Figure 3:
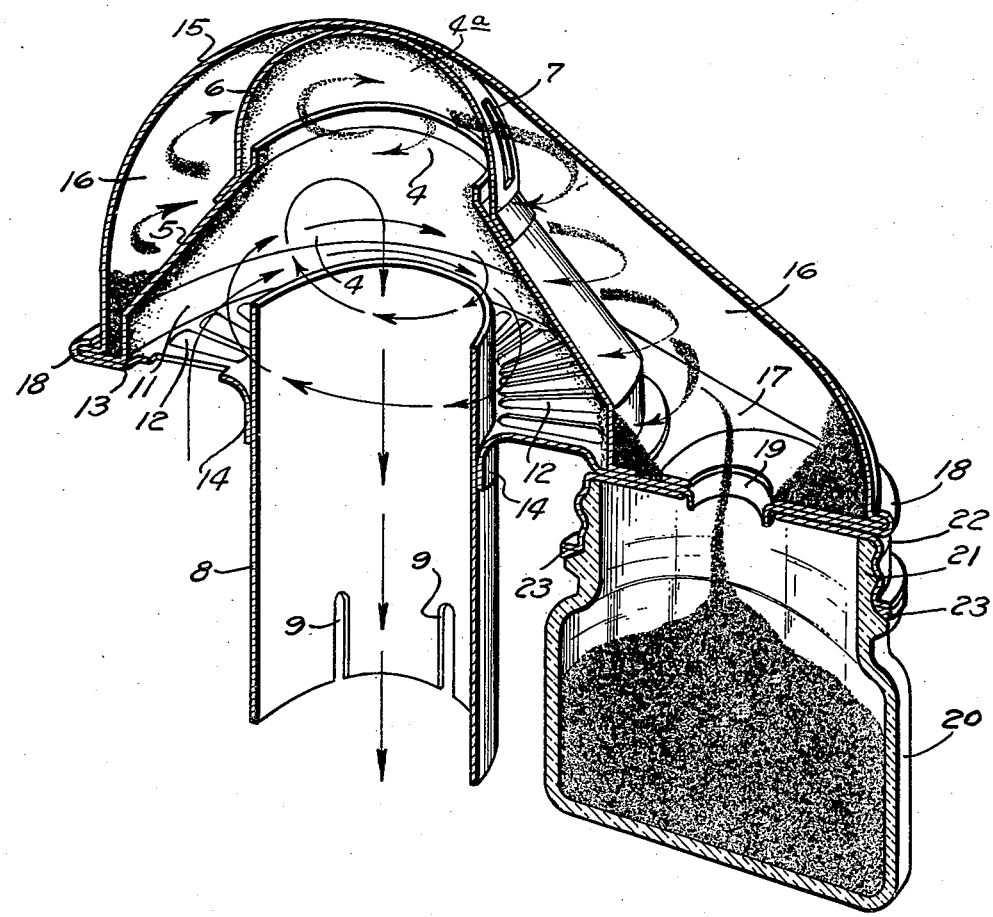
Fig. 3 is a perspective sectional view sectioned as in Fig. 1.

The separating chamber 4 of the cleaner is formed by an inverted conical member 5, that is primarily open at its large diameter lower end and at its reduced diameter end, and an inverted cup or dome-shaped member 6 which closes the reduced diameter upper end portion of the conical member 5. The cup-like member 6 forms the upper portion 4a of the separating chamber 4 and is provided in its side close to the top of the separating chamber with a dust outlet port 7.

Extending axially downwardly from the intermediate portion of the separating chamber 4 is an outlet tube or conduit section 8 that is adapted to be mounted directly on the end of a vertically disposed engine air intake tube or duct to form a continuation thereof. In practice the lower end of the air cleaner's outlet tube 8 is usually telescopically applied over the upper end of the engine's intake tube and is provided with vertical slits 9 at its lower end to permit radial compression by means of a suitable clamping band or the like 10. The axial air outlet tube 8 is of smaller diameter than the large diameter lower end portion of the conical member 5 so as to leave an annular air inlet passage 11 radially between the intake tube and the lower portion of the conical member 5.

In air cleaning devices of the general character herein described, it is customary to provide in the air inlet suitable means for imparting high velocity whirling motion to the air entering the separating chamber, and in accordance with the present illustration this is accomplished by interposing in the annular air intake passage 11 a circumferentially spaced series of diagonally disposed vanes or blades 12.

In accordance with the specific example given the blades 12 are afforded by pressing out louvered openings in a base plate 13 which is rigidly mounted on the axial air outlet tube 8 at 14 and radially spans the annular intake passage 11 and is rigidly anchored to the base portion of the conical member 5 so as to form the cleaner elements described into a unitary structure.

The cleaner elements thus far described and devoid of other elements shown but not yet described would constitute a commercially well known type of ejector cleaner and would function substantially as follows: Assuming that the device in this incomplete form was used in connection with a suitable suction producing device such as an internal combustion engine, air would, under operating conditions, be drawn into the separating chamber 4 through the deflecting blade-equipped annular intake passage 11 and would have a high velocity whirling action imparted thereto by the blades or vanes 12. Dust and other foreign matter contained in the air will be thrown centrifically outward to the conical wall 5 of the separating chamber 4 and would progress spirally upwardly under increasing velocity due to the diminishing diameter of the conical wall 5, until such dust would finally pass under this high velocity whirling action into the dome-shaped upper portion 4a of the separating chamber 4 where it would be thrown centrifugally outwardly to outside atmosphere through the dust discharge port 7. The clean air entering the separating chamber 4 under high velocity whirling action would, of course, reverse its direction of travel within the separating chamber 4 and pass downwardly and be discharged through the clean air outlet tube 8.

In such ejector type of cleaner the dust must be discharged under centrifugal action to atmosphere through the discharge port 7, usually against an inward movement of air through the port 7 resulting from the fact that there will be an atmospheric pressure within the separating chamber, and it is well recognized in the industry that the ejector type of cleaner is not as efficient as the collector type to which class the present invention belongs. The partial structure thus far described is, in fact, substantially identical to the ejector type of cleaner indicated at B in the Lowther Patent No. 1,875,471.

In accordance with the instant invention the entire sides and top of the elements 5 and 6 which form the walls of the separating chamber 4 are enclosed within a dome-like outer shell 15. The sides of the outer shell 15 are spaced from the sides of the elements 5 and 6 to form a primary atmosphere closed dust chamber 16 completely surrounding the sides of the separating chamber 4. The lower edge of the outer shell 15 terminates substantially in a common vertical plane with the lower edge of the conical element 5 and this lower edge of the shell 15, throughout somewhat over 180° of its circumference, is concentric with the circular lower edge of the conical member 15, but, as will be seen by reference to the drawings, one side portion of this outer shell 15 is eccentrically and tangentially offset with respect to the axis of the separating chamber 4 and air intake tube 8. Likewise, the louvered base plate 13 is provided with an eccentrically and tangentially offset portion 17 and is united preferably by flange and bead connection 18 at its periphery with the bottom of the shell section 16 so as to anchor the shell section 16 and close the bottom portion of the primary dust chamber 16 radially outward of the conical member 5. The primary dust chamber 16, as will be seen, is of distorted annular formation and is provided in the bottom of its eccentrically offset portion radially outward of the air intake passage 11 with a dust discharge passage 19 formed in the eccentrically projected portion 17 of the base plate 13.

Removably secured to the eccentrically offset portion 17 of the base plate 13 in axial registration with the dust outlet passage 19 of the primary dust chamber 16 is a secondary dust receptacle 20 which, in accordance with conventional practice, is formed of transparent material such as glass and may be assumed to be of the common fruit jar variety having an externally screw threaded neck 21.

The secondary dust receptacle 20 is located largely radially outwardly of the primary air intake passage in parallel radially spaced relation to the outlet tube 8 and is removably anchored to the base plate 13 preferably by means of a screw threaded cover-acting nipple 22, the top of which is closed except for an axial opening registering with the dust outlet passage 19 and is welded or otherwise rigidly anchored to the base plate 13.

To prevent air from entering the secondary dust receptacle through the screw threaded joint described a suitable gasket 23, which may be of the common fruit jar variety, may be employed.

Since the primary dust chamber 16 and the secondary dust receptacle 20 are closed to atmosphere except through the opening chamber 4, there is, of course, no inward movement of air to the separating chamber 4 through the dust port 7 under continuous operating conditions to retard the outward flow of dust through port 7, hence the efficiency of the device over the incomplete dust ejector type cleaner earlier described will be considerably increased. With the complete device illustrated, dust particles ejected under centrifugal action through the port 7 will continue to whirl within the primary dust chamber about the walls 5 and 6 under continually decreasing velocity until they finally come to rest in the bottom of the primary dust chamber or until they pass under the action of gravity through the dust discharge port 19 into the secondary dust receptacle 20 and deposit on the bottom of the latter.

Under initial operation of the device most of the dust discharged through port 7 will come to rest within the primary dust chamber 16, but under continued operation the crevices and corners of the primary dust receptacle will gradually become filled up and rounded out so that more and more dust thrown centrifically into the primary chamber 16 will be discharged through passage 19 into the secondary dust receptacle. This partial filling of the primary dust chamber 16 will not in any way effect the efficiency of the device. Of course, the secondary dust receptacle being transparent will enable the operator to keep visual check on its condition and, whereas the device should be taken off and cleaned before the secondary receptacle 20 is completely filled, this device provides a considerable safety factor in that the primary dust chamber 16 will have a large dust capacity even after the secondary dust receptacle has been filled.

When the secondary dust receptacle is removed, dust can be dislodged from the primary dust chamber 16 and shaken outwardly through the dust passage 19.

What I claim is:

1. In a centrifugal dust collecting type of air cleaner, a vertically disposed separating chamber that is circular in cross section, a clean air outlet tube co-axial with the separating chamber and extending downwardly from the interior thereof and being of smaller diameter than the lower end of the separating chamber, an annular intake passage adjacent the lower end of the separating chamber surrounding said clean air outlet tube, means for imparting a whirling motion to air entering the separator chamber through said annular air intake passage, a dust outlet port in the wall of the separating chamber near the upper end thereof, an eccentrically offset primary dust collecting chamber enclosing the top and side portions of the separating chamber, a dust discharge passage in the bottom of the eccentrically offset portion of the primary dust collecting chamber, and a secondary dust receptacle removably secured to the eccentrically offset bottom portion of the primary dust collecting chamber with its interior in communication with said dust discharge passage.

2. The structure defined in claim 1 in which said primary dust chamber and secondary dust receptacle are closed to atmosphere except through the separating chamber.

3. The structure defined in claim 1 in which the said secondary dust receptacle is disposed in spaced parallel relation to the axial air intake tube.

4. In a centrifugal dust collecting type air cleaner, a separating chamber having an upwardly tapering conical wall, a clean air outlet tube co-axial with the separator chamber and extending downwardly from the interior portion thereof and being of smaller diameter than the lower end of the separating chamber so as to leave therebetween and the lower portion of the separator chamber side walls an annular intake passage, a dust outlet port in the wall of the separator chamber near the reduced diameter upper end thereof, an eccentrically offset primary dust collecting chamber enclosing the top and side portions of the separator chamber, and a dust discharge passage in the bottom of the eccentrically offset portion of the primary dust collecting chamber and a dust receptacle removably secured to the eccentrically offset bottom portion of the primary dust collecting chamber with its interior in communication with said dust discharge passage.

5. The structure defined in claim 1 in which the said secondary dust receptacle is located radially outward of the annular intake passage and is disposed in parallel spaced relation to the axial air inlet tube.

6. In a centrifugal dust collecting type of air cleaner, a vertically disposed separating chamber that is circular in cross section, a clean air outlet tube co-axial with the separating chamber and extending downwardly from the interior portion thereof, said clean air outlet tube being of smaller diameter than the lower end of the separating chamber to afford an upwardly directed annular air intake passage adjacent the lower end of the separating chamber surrounding the clean air outlet tube, means for imparting a whirling motion to air and dust entering the separating chamber through said annular air intake passage, a dust outlet port in the upper portion of the wall of the separating chamber, a dust collecting receptacle located below the separating chamber and in laterally spaced relation to the clean air outlet tube, and means for conducting dust from said outlet port to said dust collecting receptacle.

7. The structure defined in claim 6 in which the said dust collecting receptacle is vertically disposed and parallel to said clean air outlet tube.

FRANK A. DONALDSON.